United States Patent
Wu et al.

(10) Patent No.: US 10,276,935 B2
(45) Date of Patent: Apr. 30, 2019

(54) METHOD FOR FABRICATING AN ELECTROMAGNETIC INDUCTION DIGITIZER ANTENNA BOARD

(71) Applicants: Yingchao Wu, Guangdong (CN); Song Chen, Guangdong (CN); Hang Luo, Guangdong (CN)

(72) Inventors: Yingchao Wu, Guangdong (CN); Song Chen, Guangdong (CN); Hang Luo, Guangdong (CN)

(*) Notice: Subject to any disclaimer, the term of this patent is extended or adjusted under 35 U.S.C. 154(b) by 177 days.

(21) Appl. No.: 15/342,127

(22) Filed: Nov. 3, 2016

(65) Prior Publication Data

US 2018/0123246 A1    May 3, 2018

(51) Int. Cl.
| | |
|---|---|
| *H01P 11/00* | (2006.01) |
| *H01Q 13/00* | (2006.01) |
| *H01Q 7/00* | (2006.01) |
| *H04B 5/00* | (2006.01) |

(52) U.S. Cl.
CPC ............. *H01Q 7/00* (2013.01); *H04B 5/0081* (2013.01)

(58) Field of Classification Search
CPC ................................ H04B 5/0081; H01Q 7/00
See application file for complete search history.

(56) References Cited

U.S. PATENT DOCUMENTS

| | | | | |
|---|---|---|---|---|
| 7,268,771 B2* | 9/2007 | Shi | ......................... | G06F 3/046 345/173 |
| 7,626,134 B1* | 12/2009 | Klein | ................... | H05H 1/0081 219/121.36 |
| 9,236,662 B2* | 1/2016 | Jang | ........................ | H01Q 21/00 |
| 9,990,069 B2* | 6/2018 | Yao | ........................ | G06F 3/0412 |
| 2004/0189619 A1* | 9/2004 | Yun | ......................... | G06F 3/046 345/179 |
| 2005/0270272 A1* | 12/2005 | Shi | .......................... | G06F 3/046 345/173 |
| 2009/0231299 A1* | 9/2009 | Shi | ......................... | G06F 3/0416 345/173 |
| 2014/0210711 A1* | 7/2014 | Liu | ........................ | G06F 3/0383 345/157 |
| 2016/0179266 A1* | 6/2016 | Yang | ........................ | G06F 3/044 345/174 |

* cited by examiner

*Primary Examiner* — Paul D Kim

(57) ABSTRACT

A method for fabricating an electromagnetic induction digitizer antenna board that includes the steps of: a. preparing a substrate that is convenient for being holed; b. providing a consecutive wire leading-out terminal at one side of the substrate; c. moving the substrate relative to the consecutive wire leading-out terminal along with a predetermined track of the electromagnetic induction coil of the induction digitizer antenna board, so that the consecutive wire leading-out terminal gets in surface-contact with the substrate, and configures the electromagnetic induction coil on the substrate; d. binding the conductive wire of the electromagnetic induction coil with the substrate at every predetermined interval.

14 Claims, 6 Drawing Sheets

METHOD FOR FABRICATING AN ELECTROMAGNETIC INDUCTION DIGITIZER ANTENNA BOARD

BACKGROUND OF THE INVENTION

The present invention relates to an antenna board, and particularly to a method for fabricating an electromagnetic induction digitizer antenna board adapted for handwriting input.

Currently, electromagnetic induction antennas for handwriting input are usually fabricated by the printing technology, in which multiple layers of printed circuits are stacked one on another to achieve induction positioning of a plurality of electromagnetic induction coils. Regarding the antenna fabricating technology for large-size electromagnetic induction digitizer, people skilled in the art tried to realize the automatic coiling of metal wires by simulating the manual coiling method. However, doing this requires large investment in equipment development, and particularly it is very difficult to realize, and the equipment are often complicate for operation, not reliable, and hard for maintenance. Therefore, this approach may hardly save cost, and so far the technology is far from workable. China Patent number CN102447162B discloses an invention, in which ultrasonic embedding technology is introduced to implant the coil inside the surface of the substrate, e.g., PVC substrate, so as to fabricate a large-size antenna board with a lower cost. However, one of the biggest difficulties of such technology is that there are too many intersection points between coils. Therefore, during the ultrasonic embedding process, according to this technology, intersection points are often skipped. As such, when there are many intersection points, the process will be very slow, and the working efficiency will also be low. In addition, it also leads to additional machine depreciation, as well as other problems such as wire breaking. China Patent Application Number CN102760939A modifies the ultrasonic embedding technology, in which, for the purpose of reducing the intersection points, non-overlapping coils are disposed in the same layer and prepare a plurality of layers, and then all the layers are compressed into an antenna board. Unfortunately, such an approach makes the antenna board much thicker, and also introduces additional difficulty to the fabrication. In summary, the conventional technologies for fabricating antenna boards of electromagnetic induction digitizers mainly have the following defects: regarding the conventional thin film type and printing circuit board type antennas, the cost is very high and it's very difficult to fabricate large-size antennas; regarding the manual coiling method, the working efficiency is low, and it requires a lots of manpower, and further the product quality is often inconsistent, thus the production yield will be low; regarding the complex automatic coiling machine, the equipment is usually very expensive, and complicate to maintain, while the technology is still under-development, and thus difficult to extensively use; as to the ultrasonic embedding equipment which is relatively well used, the technology is still too complicate, the working efficiency is still low, and the antenna board is thick.

BRIEF SUMMARY OF THE INVENTION

The present invention provides a solution to the technical difficulty of the coiling and positioning of the conductive wires when fabricating the electromagnetic induction digitizer antenna board. The present invention further provides a solution to another technical difficulty that the electromagnetic induction digitizer antenna board includes many bridging connections, to which the solutions given by the conventional technologies are very complex. An objective of the present invention is to solve the following technical difficulties of the conventional technologies: during the fabrication of the electromagnetic induction digitizers, the conductive wire coiling or printing is often featured with a low yield rate and high production cost, expansive equipment and thick antenna boards, which cannot satisfy the desire for thinner electronic devices. The present invention also provides a solution to the technical difficulty of conductive wires which are often curve due to the pulling when binding the conductive wires. The present invention is featured with a lower production cost, a better quality consistence, a higher yield rate, and the production equipment is less complex with a relatively well-developed fabrication technology of electromagnetic induction digitizer antenna board.

For the purpose of realizing the foregoing objectives, the present invention provides a method for fabricating an electromagnetic induction digitizer antenna board. The method includes the following steps:

a. preparing a flat substrate for configuring an electromagnetic induction coil thereon, wherein the substrate is adapted for being holed to form through holes;

b. providing a consecutive wire leading-out terminal at one side of the substrate for configuring the electromagnetic induction coil on the substrate, wherein the consecutive wire leading-out terminal is adapted for outputting a conducive wire therefrom;

c. moving the substrate relative to the consecutive wire leading-out terminal along with a predetermined track of the electromagnetic induction coil of the induction digitizer antenna board, so that the consecutive wire leading-out terminal gets in surface-contact with the substrate, and configures the electromagnetic induction coil on the substrate;

d. during the relative movement of the substrate and the conductive wire leading-out terminal, binding the conductive wire of the electromagnetic induction coil with the substrate at every predetermined interval, an axial direction of the conductive wire of the electromagnetic induction coil being parallel with a horizontal level of the substrate; and e. configuring a plurality of electromagnetic induction coils as of step d, wherein the electromagnetic induction coils positioned at a same layer of the substrate overlaps each other, and the overlapped electromagnetic induction coils cross over each other, wherein the electromagnetic induction coils are electrically connected to a computing circuit of the digitizer control board.

According to an aspect of the present invention, in step d, an automatic conductive wire binding mechanism is provided to deliver binding threads to automatically bind the conductive wires, wherein the automatic conductive wire binding mechanism periodically holes the substrate and binds the conductive wires to the substrate at every predetermined interval.

According to an aspect of the present invention, the automatic conductive wire binding mechanism is a computer-aided embroidery machine, and the consecutive wire leading-out terminal is a surface thread output terminal or a bottom thread output terminal of the computer-aided embroidery machine.

According to an aspect of the present invention, the automatic conductive wire binding mechanism is a quilt sewing machine, and the consecutive wire leading-out terminal is a surface thread output terminal or a bottom thread output terminal of a machine head of the quilt sewing machine.

According to an aspect of the present invention, the automatic conductive wire binding mechanism is a single-needle single-thread chain-stitch sewing machine, and the consecutive wire leading-out terminal is a wire output opening of a mechanical arm adapted for moving along with a predetermined track of the electromagnetic induction coil of the induction digitizer antenna board.

According to an aspect of the present invention, the substrate is a fiber surface or a hook surface of a large-size hook and loop tap, and the consecutive wire leading-out terminal is a wire output opening of a mechanical arm adapted for moving along with a predetermined track of the electromagnetic induction coil of the induction digitizer antenna board.

According to an aspect of the present invention, an assembly cutting position is defined, and after configuring and binding the electromagnetic induction coils, the electromagnetic induction coils are connected to a digitizer control board computing circuit and are cut at the assembly cutting position.

According to an aspect of the present invention, in the step d, an electronic control glue dispenser is provided for dispensing glue at every predetermined interval so as to periodically bind the conductive wires to the substrate.

According to an aspect of the present invention, in the step d, the substrate is holed in a manner of hot-melting to periodically bind the conductive wire of the electromagnetic induction coil with the substrate at every predetermined interval.

According to an aspect of the present invention, the consecutive wire leading-out terminal is one of the surface thread output terminal and a bottom thread output terminal of the computer-aided embroidery machine, and another of the surface thread output terminal and the bottom thread output terminal of the computer-aided embroidery machine outputs bottom threads or surface threads to bind the conductive wires to the substrate at every predetermined interval, and wherein the binding threads are bottom threads or surface threads of the computer-aided embroidery machine, and the binding threads are elastic plastic thread.

According to an aspect of the present invention, a glue track is pre-printed on the substrate according to the predetermined track of the electromagnetic induction coil of the induction digitizer antenna board.

According to an aspect of the present invention, a glue layer is provided on the conductive wires to glue and bind the conductive wires with the substrate when the consecutive wire leading-out terminal moves the conductive wires in contact to the substrate.

According to an aspect of the present invention, the consecutive wire leading-out terminal is provided with a roller glue dispenser, and the roller glue dispenser is configured with a glue dispensing opening, and the roller glue dispenser dispenses glue on the conductive wires after each rolling cycle in accordance with the length of the output conductive wires.

According to an aspect of the present invention, the conductive wires are provided with a tiny holing needle after each certain distance.

According to an aspect of the present invention, the consecutive wire leading-out terminal is connected with an X-Y axis track control mechanism.

According to an aspect of the present invention, the conductive wires are self-adhesive enameled wires.

According to an aspect of the present invention, the surface thread output terminal or the bottom thread output terminal includes a needle having a rolling ball configuration, and the needle includes a through hole and a binding thread positioned through the thread through hole.

According to the present invention, the substrate can be adaptively selected from papery, leathery or fabric materials, preferably having a mesh structure. Such materials are more convenient for being holed for fixing or binding the wires. The computer-aided embroidery machine, the quilt sewing machine, or the single-needle single-thread chain-stitch sewing machine are well developed, and the present invention employs such machines for binding the conductive wires, so that it is convenient to use the computer-aided embroidery design software to design the layout of the electromagnetic induction coils and bind them with binding threads.

The present invention has the following advantages: the present invention employs well developed computer-aided embroidery machine for binding the conductive wires, thus drastically saving fabrication and design cost; cheap threads can be used as serving as the binding threads, and low-cost substrate can be used and therefore the total cost could be very low; only one fabrication procedure, i.e., embroidery procedure, is needed for all the fabrication process, and therefore the working procedure is much simplified; there is no pollutes produced during the fabrication process, and therefore comparing the conventional technologies, the present invention is more environment friendly; the needle head of the computer-aided embroidery machine can be selected very sharp, even smaller than 0.1 mm, and thus capable of making very dense needle stitches, and in this manner, during the layout design, very small line distance is practical and realizable, so that the present invention is capable of realize the production of small size and super large antenna boards, which is even impossible for conventional technologies. The stitching process realizes the binding of the conductive wires, and has no adverse effect to intersections of the conductive wires, thus providing a perfect solution to the bridging connections. According to the present invention, an antenna board including an X-axle antenna and a Y-axle antenna which are overlapped each other can be configured on a single substrate. Such an antenna board is much thinner than that of the conventional layer by layer fabrication technology. Using elastic threads as the binding threads prevents the technical problem of conductive wires are often curve due to the pulling when binding the conductive wires, thus saving the binding threads and improving the positioning accuracy. Conventional technologies often adopt multi-layer bridging connections for antenna boards having overlapped multi-layer electromagnetic induction coils. In comparison, the present invention is adapted for realize sophisticated bridging connection among electromagnetic induction coils on the same layer of substrate. As such, the present invention greatly decreases the thickness of the electromagnetic digitizer control board, and is more desirable for the thinner electronic appliances. An additional procedure of rolling pressing the electromagnetic induction coils and the substrate may advantageously position all the electromagnetic induction coils at the same level.

The accompanying drawings are included to provide a further understanding of the invention, and are incorporated in and constitute a part of this specification. The drawings illustrate embodiments of the invention and, together with the description, serve to explain the principles of the invention.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE INVENTION

The accompanying drawings are included to provide a further understanding of the invention, and are incorporated in and constitute a part of this specification. The drawings illustrate embodiments of the invention and, together with the description, serve to explain the principles of the invention.

A method for fabricating an electromagnetic induction digitizer antenna board, comprising the steps of:

a. preparing a flat substrate for configuring an electromagnetic induction coil thereon, wherein the substrate is adapted for being holed to form through holes;

b. providing a consecutive wire leading-out terminal at one side of the substrate for configuring the electromagnetic induction coil on the substrate, wherein the consecutive wire leading-out terminal is adapted for outputting a conducive wire therefrom;

c. moving the substrate relative to the consecutive wire leading-out terminal along with a predetermined track of the electromagnetic induction coil of the induction digitizer antenna board, so that the consecutive wire leading-out terminal gets in surface-contact with the substrate, and configures the electromagnetic induction coil on the substrate;

d. during the relative movement of the substrate and the conductive wire leading-out terminal, binding the conductive wire of the electromagnetic induction coil with the substrate at every predetermined interval, an axial direction of the conductive wire of the electromagnetic induction coil being parallel with a horizontal level of the substrate; and e. configuring a plurality of electromagnetic induction coils as of step d, wherein the electromagnetic induction coils positioned at a same layer of the substrate overlaps each other, and the overlapped electromagnetic induction coils cross over each other, wherein the electromagnetic induction coils are electrically connected to a computing circuit of the digitizer control board.

First Embodiment

Figure 1:
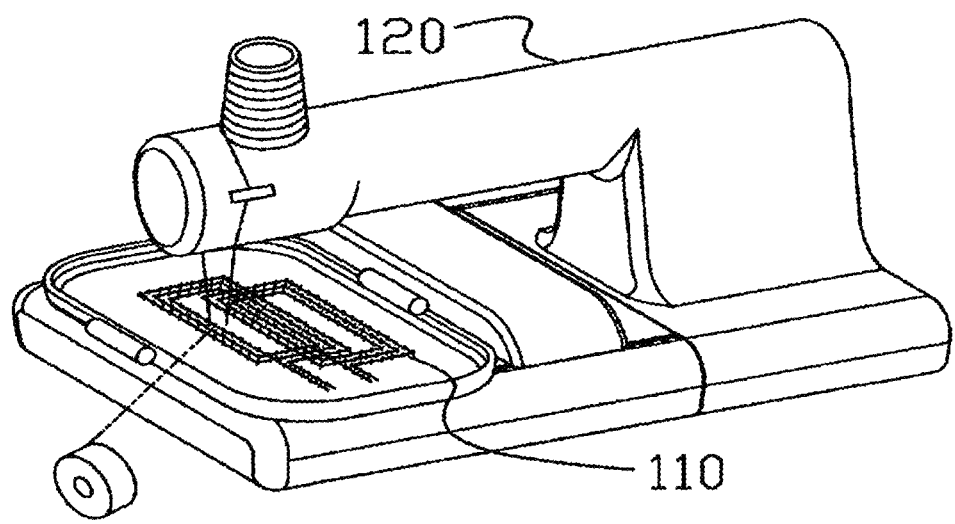
FIG. 1 is a schematic diagram illustrating a computer-aided embroidery machine outputting a conductive wire and a binding thread.

FIG. 1 is a schematic diagram illustrating a computer-aided embroidery machine outputting a conductive wire and a binding thread. Referring to FIG. 1, according to an embodiment of the present invention, a method for fabricating an electromagnetic induction digitizer antenna board. The method includes the following steps. At first, a flat substrate for attaching with an electromagnetic induction coil is prepared, wherein the substrate is adapted for being holed with through holes. The substrate can be adaptively selected from papery material, leathery material, fabric material, weaving textile material, artificial leathery material, and plastic material. Then, a consecutive wire leading-out terminal is provided at one side of the substrate for configuring an electromagnetic induction coil. The consecutive wire leading-out terminal is adapted for outputting a conductive wire therefrom. The consecutive wire leading-out terminal outputs and coils to configure the electromagnetic induction coil. A binding thread is provided to bind and fix the electromagnetic induction coil. According to the embodiment of the present invention, the binding thread is an elastic thread, preferably an elastic plastic thread or elastic cotton thread. The employment of the elastic binding thread provides a perfect solution to the technical difficulty of conductive wires which are often curve due to the pulling when binding the conductive wires. The computer-aided embroidery machine has a surface thread output terminal or a bottom thread output terminal. According to one aspect of the embodiment, the surface thread output terminal serves as the consecutive wire leading-out terminal to output and coil the electromagnetic induction coil, and correspondingly the bottom thread output terminal serves as a binding thread output terminal to output the binding thread for binding and fixing the conductive wires. According to another aspect of the embodiment, the bottom thread output terminal serves as the consecutive wire leading-out terminal to output and coil the electromagnetic induction coil, and correspondingly the surface thread output terminal serves as the binding thread output terminal to output the binding thread for binding and fixing the conductive wires. In this regard, the computer-aided embroidery machine serves as an automatic conductive wire binding mechanism, and at the same time also serves to provide the consecutive wire leading-out terminal. The substrate is then moved relative to the consecutive wire leading-out terminal along with a predetermined track of the electromagnetic induction coil of the induction digitizer antenna board, so that the consecutive wire leading-out terminal surface contacts the substrate, and then outputs the conductive wire to configure the electromagnetic induction coil. Facilitated with the computer-aided embroidery design software, the computer-aided embroidery machine configures layout design the electromagnetic induction coils, and the consecutive wire leading-out terminal realizes the layout on the substrate. The binding thread output terminal provides the binding threads to bind and fix the conductive wires. Preferably, during the relative movement of the substrate and the conductive wire leading-out terminal, the conductive wires of the electromagnetic induction coil is bound with the binding threads on the substrate periodically at every predetermined interval. The conductive wire of the electromagnetic induction coil is axially parallel with a horizontal level of the substrate. In such a way, a plurality of electromagnetic induction coils is produced, in that the electromagnetic induction coils positioned at a same layer of the substrate overlap each other, and the overlapped electromagnetic induction coils cross over each other, and the electromagnetic induction coils are electrically connected to a computing circuit of the digitizer control board. Preferably, in application, a machine head of the computer-aided embroidery machine remains unmoved while the substrate moves along with the predetermined track of the electromagnetic induction coil of the induction digitizer antenna board.

Second Embodiment

Figure 2:
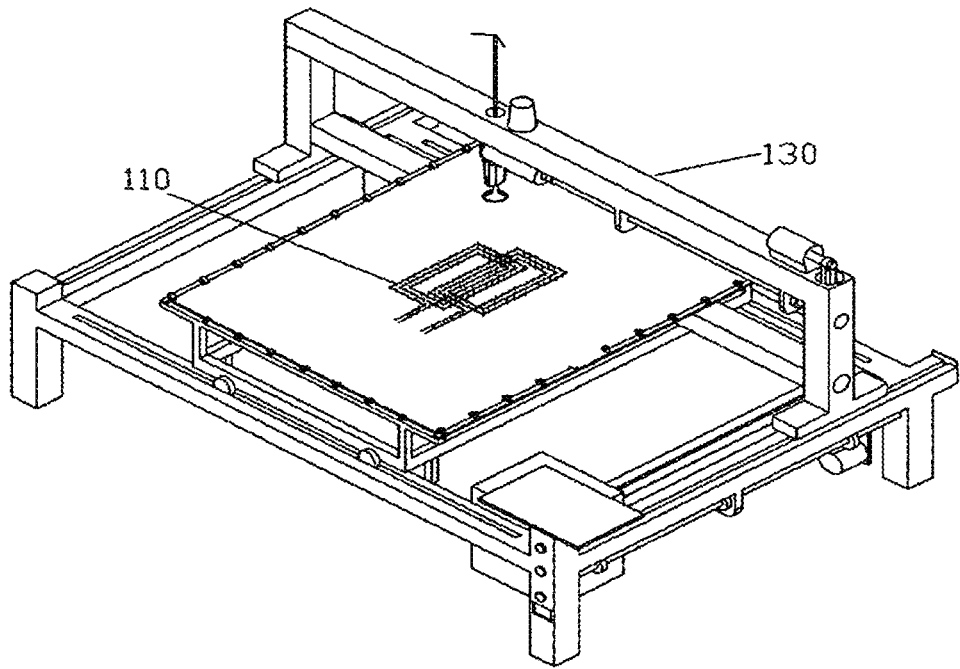
FIG. 2 is a schematic diagram illustrating a quilt sewing machine outputting a conductive wire and a binding thread.

FIG. 2 is a schematic diagram illustrating a quilt sewing machine 130 outputting a conductive wire and a binding thread. Referring to FIG. 2, similar to the first embodiment, the quilt sewing machine has a surface thread output terminal or a bottom thread output terminal. According to one aspect of the embodiment, the surface thread output terminal serves as the consecutive wire leading-out terminal to output and coil the electromagnetic induction coil, and correspondingly the bottom thread output terminal serves as the binding thread output terminal to output the binding thread for binding and fixing the conductive wires. According to another aspect of the embodiment, the bottom thread output terminal serves as the consecutive wire leading-out terminal to output and coil the electromagnetic induction coil, and correspondingly the surface thread output terminal serves as the binding thread output terminal to output the binding thread for binding and fixing the conductive wires. In this regard, the quilt sewing machine serves as the automatic conductive wire binding mechanism, and at the same time also serves to provide the consecutive wire leading-out terminal. According to an aspect of the embodiment, the substrate remains unmoved while the machine head of the quilt sewing machine moves along with the predetermined track of the electromagnetic induction coil of the induction digitizer antenna board to configure the electromagnetic induction coils 110 of the antenna board. According to an aspect of the embodiment, an assembly cutting position is defined for the electromagnetic induction coils 110, and after configuring and binding the electromagnetic induction coils 110, the electromagnetic induction coils are connected to a digitizer control board computing circuit and are cut at the assembly cutting position.

Third Embodiment

Figure 3:
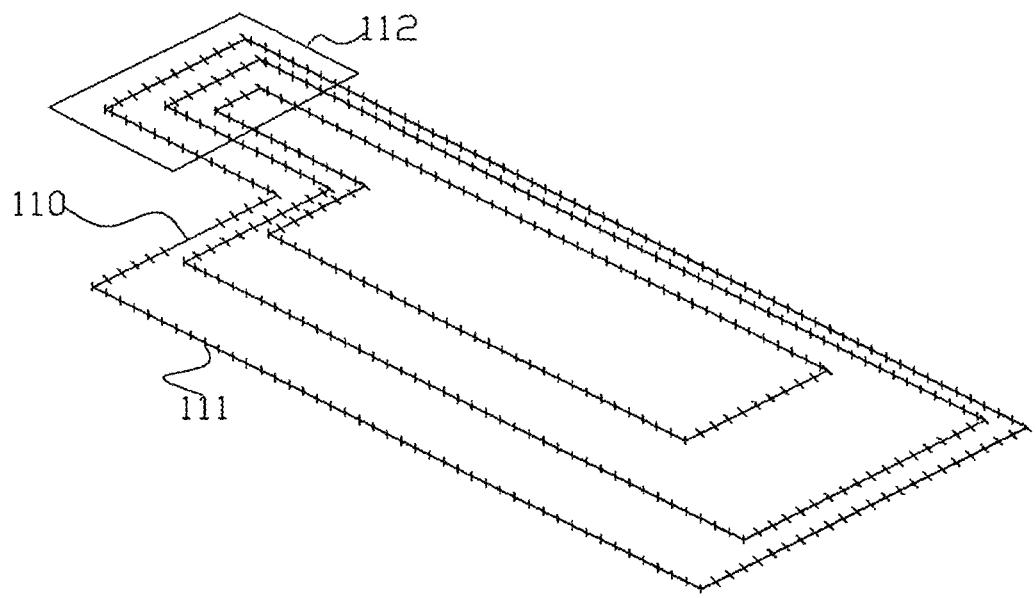
FIG. 3 is a schematic diagram illustrating a single-needle single-thread chain-stitch sewing machine outputting a binding thread.

FIG. 3 is a schematic diagram illustrating a single-needle single-thread chain-stitch sewing machine outputting a binding thread. Referring to FIG. 3, the single-needle single-thread chain-stitch sewing machine has a surface thread output terminal but does not need bottom threads. A mechanical arm having a wire output opening is provided serving as the conductive wire leading-out terminal, and the surface thread output terminal of the single-needle single-thread chain-stitch sewing machine serves as the automatic conductive wire binding mechanism. The wire output opening outputs the conductive wires and configures the electromagnetic induction coils 110, and the surface thread output terminal of the single-needle single-thread chain-stitch sewing machine outputs the binding threads 111 to bind and fix the electromagnetic induction coils 110. The wire output opening moves together with the machine head of the single-needle single-thread chain-stitch sewing machine along with a predetermined track of the electromagnetic induction coil 110 of the induction digitizer antenna board, thus binding and fixing the electromagnetic induction coils 110. According to the embodiment, the conductive wires of the electromagnetic induction coil 110 are bound with by binding threads 111 on the substrate periodically at every predetermined interval, preferably 0.2 cm to 2 cm. According to an aspect of the embodiment, an assembly cutting position, i.e., the area 112 as shown in FIG. 3, is defined for the electromagnetic induction coils 110, and after configuring and binding the electromagnetic induction coils 110, the electromagnetic induction coils are connected to a digitizer control board computing circuit and are cut at the assembly cutting position.

Fourth Embodiment

According the fourth embodiment of the present invention, an electronic control glue dispenser is provided for dispensing glue at every interval so as to periodically bind the conductive wires to the substrate, and the consecutive wire leading-out terminal is a wire output opening of a mechanical arm adapted for moving along with a predetermined track of the electromagnetic induction coil of the induction digitizer antenna board. According to an aspect of the embodiment, the mechanical arm is the machine head of the quilt sewing machine 130 as shown in FIG. 2. The quilt sewing machine is connected with an X-Y axis moving mechanism.

Fifth Embodiment

According to the fifth embodiment of the present invention, the substrate is holed in a manner of hot-melting to periodically bind the conductive wire of the electromagnetic induction coil with the substrate at every predetermined interval. Preferably, the needle of the automatic conductive wire binding mechanism is heated up to a certain temperature, and therefore when the needle is used to hole the substrate, the heated needle simultaneously melt the substrate to a certain degree. The consecutive wire leading-out terminal is a wire output opening of a mechanical arm adapted for moving along with a predetermined track of the electromagnetic induction coil of the induction digitizer antenna board. The needle can be heated by an electric heating coil.

Sixth Embodiment

According to the sixth embodiment of the present invention, a glue track is pre-printed on the substrate according to the predetermined track of the electromagnetic induction coil of the induction digitizer antenna board. Hot melt glue, alcohol soluble glue, self-adhesive glue, self-dry glue, ultraviolet curing glue to print the glue track. The consecutive wire leading-out terminal is a wire output opening of a mechanical arm adapted for moving along with a predetermined track of the electromagnetic induction coil of the induction digitizer antenna board. The pre-printed glue track is adapted for fixing the conductive wires.

Seventh Embodiment

According to the seventh embodiment of the present invention, a glue layer is provided on the conductive wires to glue and bind the conductive wires with the substrate when the consecutive wire leading-out terminal moves the conductive wires in contact to the substrate. Preferably, the conductive wires are enameled wires. The consecutive wire leading-out terminal is a wire output opening of a mechanical arm adapted for moving along with a predetermined track of the electromagnetic induction coil of the induction digitizer antenna board. The mechanical arm is provided with an X-Y axis track control mechanism for controlling the track of the electromagnetic induction coils of the induction digitizer antenna board. According to an aspect of the embodiment, the conductive wires are alcohol soluble self-adhesive enameled wires, and volatile solvent, e.g., dehydrated alcohol, is dropped at every interval onto the alcohol soluble self-adhesive enameled wires. In such a way, the glue on the enameled wires is dissolved and then flows to in-between of the substrate and the enameled wires, during which the solvent volatilizes and the glue is rapidly cured, so that the enameled wires are fixed to the substrate. According to another aspect of the embodiment, the conductive wires are hot melt enameled wires, and the a thermal press head is employed to thermal press the hot melt enameled wires and the substrate at each interval, and therefore the hot melt glue on the enameled wires melts to fix the enameled wires to the substrate.

Eighth Embodiment

According to the eighth embodiment of the present invention, the consecutive wire leading-out terminal is a wire output opening of a mechanical arm adapted for moving along with a predetermined track of the electromagnetic induction coil of the induction digitizer antenna board. The mechanical arm is provided with an X-Y axis track control mechanism for controlling the track of the electromagnetic induction coils of the induction digitizer antenna board. A roller glue dispenser is provided, and the roller glue dispenser is configured with a glue dispensing opening. The roller glue dispenser dispenses glue on the conductive wires after each rolling cycle in accordance with the length of the output conductive wires.

Ninth Embodiment

Figure 11:
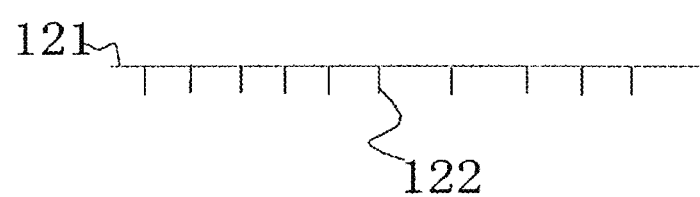
FIG. 11 is a schematic diagram illustrating a conductive wire provided with a tiny holing needle according to the present invention.

According to the ninth embodiment of the present invention, the consecutive wire leading-out terminal is a wire output opening of a mechanical arm adapted for moving along with a predetermined track of the electromagnetic induction coil of the induction digitizer antenna board. The mechanical arm is provided with an X-Y axis track control mechanism for controlling the track of the electromagnetic induction coils of the induction digitizer antenna board. The conductive wires are provided with a tiny holing needle after each certain distance. As shown in FIG. 11, the conductive wires 121 are provided with a tiny holing needle 122.

Tenth Embodiment

According to the Tenth embodiment of the present invention, the substrate is a fiber surface or a hook surface of a large-size hook and loop tap, and the consecutive wire leading-out terminal is a wire output opening of a mechanical arm adapted for moving along with a predetermined track of the electromagnetic induction coil 110 of the induction digitizer antenna board.

The consecutive wire leading-out terminal is provided with an X-Y axis track control mechanism for controlling the track of the electromagnetic induction coils of the induction digitizer antenna board. According to the foregoing embodiments, the substrate can be adaptively selected from papery, leathery or fabric materials, preferably having a mesh structure. Such materials are more convenient for being holed for fixing or binding the wires. The computer-aided embroidery machine, the quilt sewing machine, or the single-needle single-thread chain-stitch sewing machine are well developed, and the present invention employs such machines for binding the conductive wires, so that it is convenient to use the computer-aided embroidery design software to design the layout of the electromagnetic induction coils and bind them with binding threads.

Figure 12:
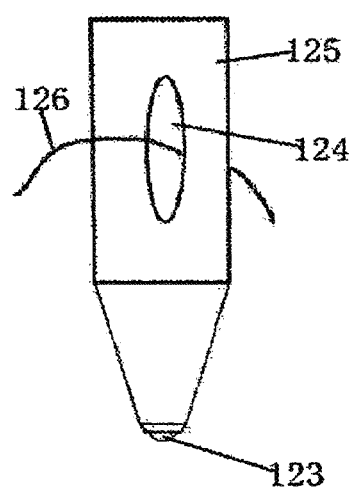
FIG. 12 schematically illustrates the needle having a rolling ball configuration.

FIG. 12 schematically illustrates a needle having a rolling ball configuration. Referring to FIG. 12, the surface thread output terminal or the bottom thread output terminal includes a needle 125 having a rolling ball configuration. The needle 125 is configured with a through hole 124 and is provided with a binding thread 126 positioned through the through hole 124. A rolling ball 123 is configured at a sharp end of the needle 125. The provision of the rolling ball 123 at the sharp end of the needle 125 prevents that the needle damages the coating of the enameled wires. The rolling ball 123 allows smooth movements of the needle relative to the substrate and the conductive wires, thus avoiding short circuit or electric leakage caused by damages of the coating of the electromagnetic induction coils 110.

Figure 4:
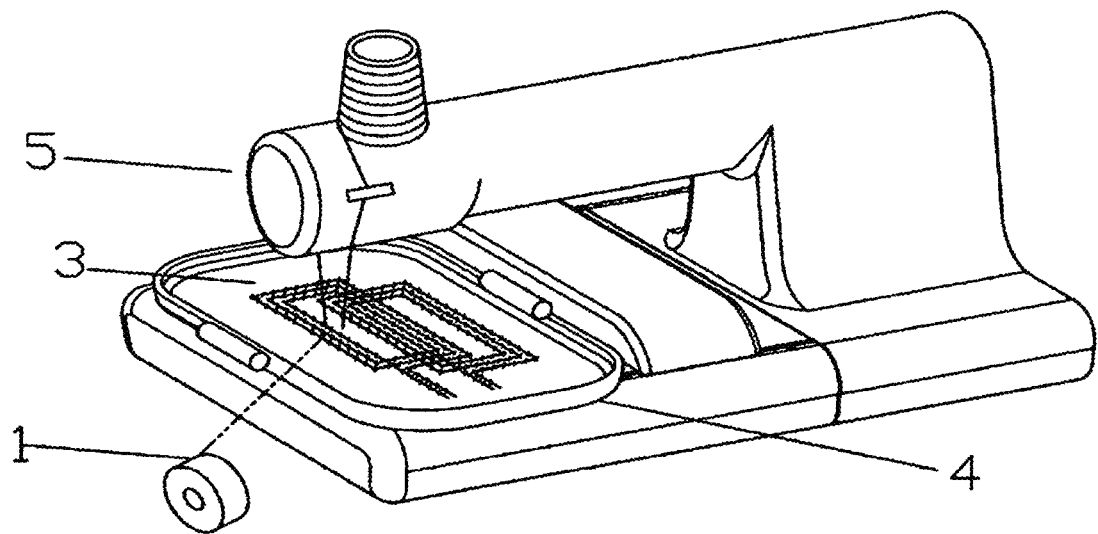
FIG. 4 is a schematic diagram illustrating the fabrication of an antenna board by a computer-aided embroidery machine according to the present invention.

FIG. 4 is a schematic diagram illustrating the fabrication of an antenna board by a computer-aided embroidery machine according to the present invention. Referring to FIG. 4, a conventional computer-aided embroidery machine 5 having a surface thread output terminal and a bottom thread output terminal is employed, and a conductive wire 1 serves as a bottom thread of the computer-aided embroidery machine. The bottom thread output terminal of the computer-aided embroidery machine 5 serves as a consecutive wire leading-out terminal and outputs the conductive wire 1 onto a non-conductive substrate 3 to configure an induction coil thereon. The substrate 3 is preferably easy and convenient to be sewed and holed with through holes. An antenna board 4 is then configured by the substrate 3 and the induction coil. The substrate is preferably selected from papery material, leathery material, fabric material, weaving textile material, artificial leathery material, and plastic material. The conductive wire 1 is a metal wire, and preferably selected from steel wire, copper wire, and aluminum wire. Because of the existence of a great amount of intersections, the conductive wire 1 is preferably having an insulation layer coated thereon, such as a cotton covered wire, or enameled wire. A non-conductive wire is selected serving as a surface thread of the computer-aided embroidery machine 5, and a surface thread output terminal of the computer-aided embroidery machine 5 serves as a binding thread output terminal and outputs the non-conductive wire to bind the conductive wire 1 output by the bottom thread output terminal of the computer-aided embroidery machine 5.

Alternatively, the conductive wire 1 can also be used as a surface thread of the computer-aided embroidery machine to configure the induction coil on the substrate 3, while the non-conductive wire serves as a bottom thread for binding the induction coil. In fact, according to embodiments of the present invention, one of the bottom thread and the surface thread is a conductive wire for configuring the induction coil, and the other one of the bottom thread and the surface thread is a non-conductive thread serving as a binding thread to bind the induction coil. The non-conductive thread is preferably selected from conventional sewing threads, e.g., cotton threads, terylene threads.

Figure 5:
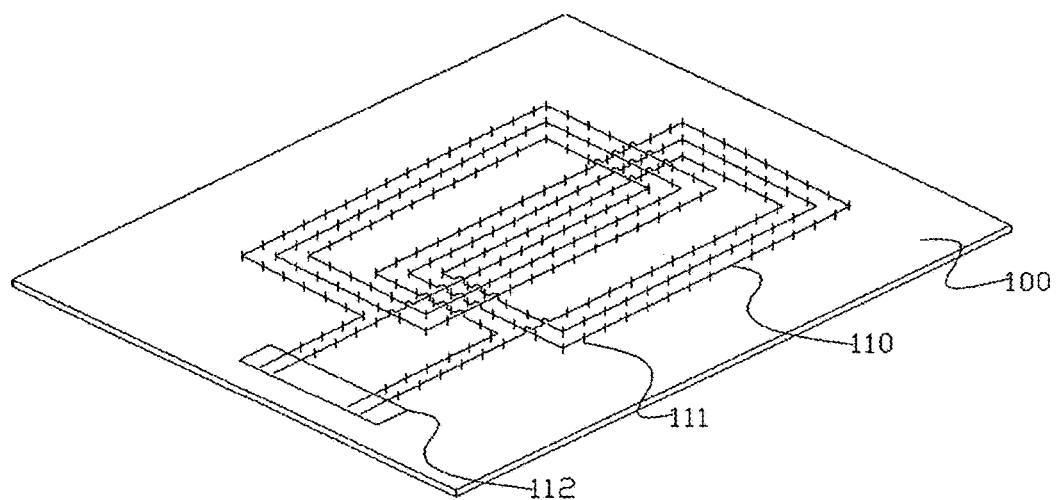
FIG. 5 is a schematic diagram illustrating two electromagnetic induction coils which are overlapped while independent each other and cross over each other according to the present invention.

FIG. 5 is a schematic diagram illustrating two electromagnetic induction coils which are overlapped while independent each other and cross over each other according to the present invention. According to the present embodiment, the consecutive wire leading-out terminal moves along with a predetermined track of the electromagnetic induction coil of the induction digitizer antenna board, and outputs the conductive wire 110 on the substrate to configure the electromagnetic induction coil. The binding thread output terminal can be a bottom thread output terminal or a surface thread output terminal of the computer-aided embroidery machine, or a machine head of the quilt sewing machine. As shown in FIG. 5, the binding thread output terminal outputs the binding thread 111. The electromagnetic induction coil is provided with a connection point 112 to be connected with a computing circuit of the digitizer control board.

Figure 6:
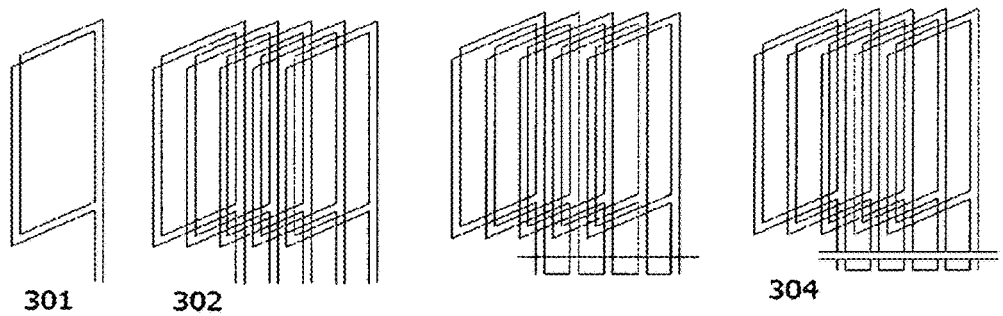
FIG. 6 is a schematic diagram illustrating a single induction coil and grouped induction coils according to the present invention.

FIG. 6 is a schematic diagram illustrating a single induction coil and grouped induction coils according to the present invention. Referring to FIG. 6, there is shown a single induction coil 301, and an induction coil group 302. According to an aspect of the embodiment, the induction coil group 302 can be X-axle induction coil, Y-axle induction coil, or exciting coil. As shown in FIG. 6, the coils are end-to-end physically connected with each other. A plurality of end-to-end connected induction coils can be once cut into independent induction coils 304. There is lots of commercial software available for layout design. For example, under WINDOWS platform, TAJIMA, WILCOM, Richpeace Embroidery layout design systems are applicable in accordance with the present invention. A typical conventional industrial computer-aided embroidery machine is equipped with an automatic cutting mechanism for cutting the surface threads and the bottom threads. Having cutting instructions added when designing the layout, the computer-aided embroidery machine is capable of, in accordance with the present invention, fabrication of a plurality of independent induction coils.

Figure 7:
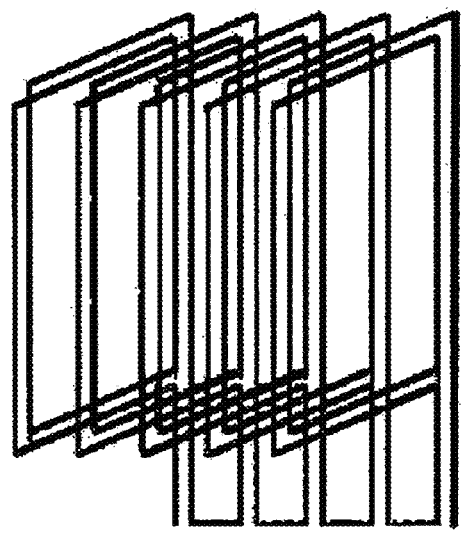
FIG. 7 is a schematic diagram illustrating a needle track layout simulated with WILCOM software.

FIG. 7 is a schematic diagram illustrating a needle track layout simulated with WILCOM software.

Figure 8:
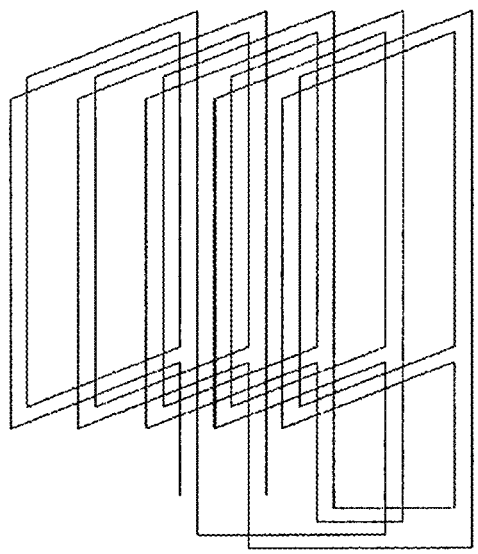
FIG. 8 is a schematic diagram illustrating a plurality of induction coils end-to-end connected each other.
Figure 9:
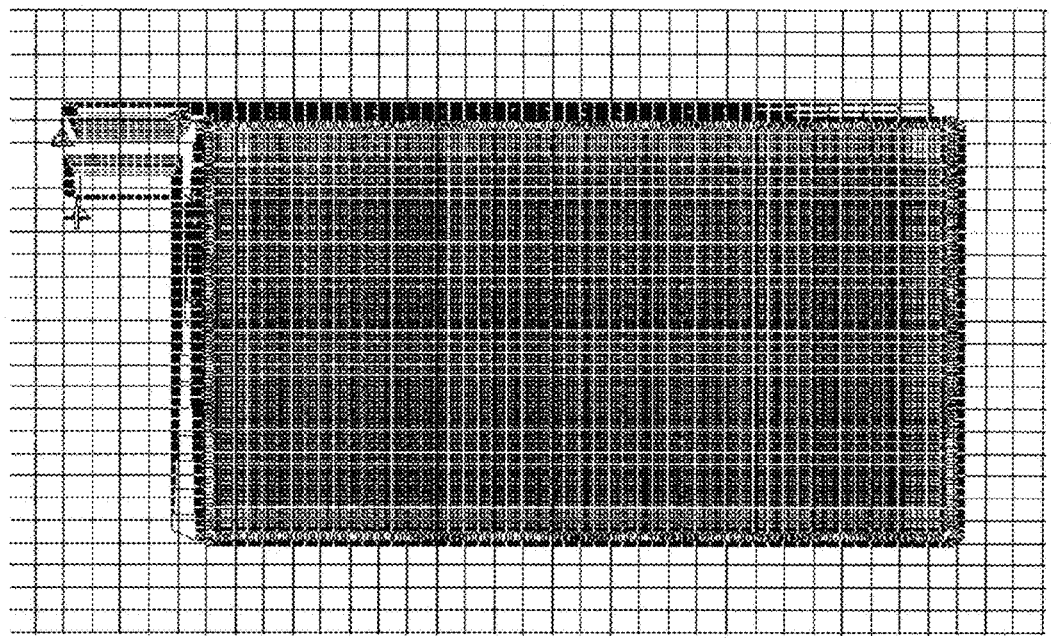
FIG. 9 is a schematic diagram illustrating an induction antenna designed with WILCOM software according to the present invention.

FIG. 8 is a schematic diagram illustrating a plurality of induction coils end-to-end connected each other. Typically, each induction coil shall have a connection lead extending therefrom for getting electrical connection with other elements, e.g., a scanning chip, and therefore one connection lead shall correspond to one induction coil. Referring to FIG. 8, a plurality of induction coils end-to-end connected each other, and therefore, one connection lead is capable of providing electrical connection for all the induction coils. In such a way, the overall connection leads of the antenna board can be drastically reduced. According to an embodiment of the present invention, the antenna board includes an X-axle coil and a Y-axle coil, and sometimes also includes an exciting coil. According to the present invention, the coils can be positioned in different layers or in the same layer as desired. The sequence of the coil fabrication can be arranged as desired. FIG. 9 is a schematic diagram illustrating an induction antenna designed with WILCOM software according to the present invention. As shown in FIG. 9, an X-axle coil and a Y-axle coil are produced by one step on the substrate, and the coils are end-to-end connected with special designed sequence.

Figure 10:
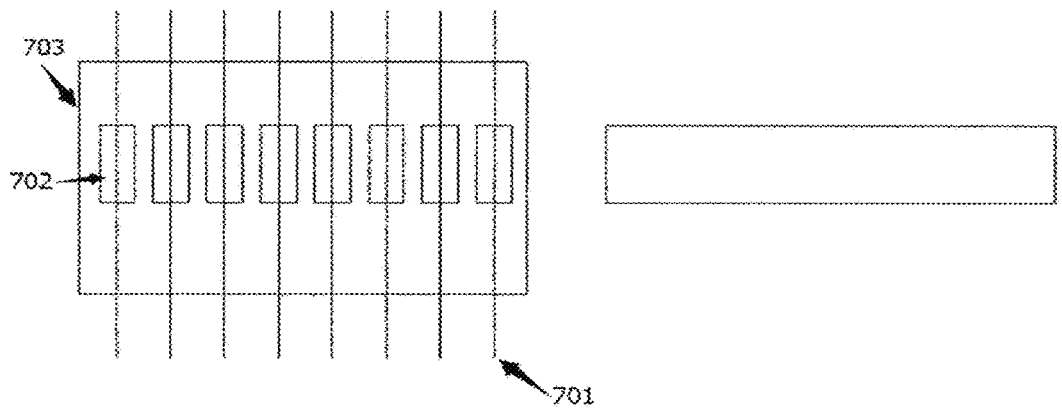
FIG. 10 schematically illustrates the connection of an antenna board to a control board according to the present invention.

FIG. 10 schematically illustrates the connection of an antenna board to a control board according to the present invention. Referring to FIG. 10, the antenna board includes a plurality of induction coils, and thus there are often tens or even more than one hundred leads. All of these leads shall be connected to the control board. According to the present invention, the leads 701 of the induction coils are arranged in assembly, a LASER cutter or other cutting equipment is used to cut remove a part of the substrate at the corresponding section of the leads thus figuring a window 703 and having a plurality of leads of the induction coils exposed. The control board is put under the antenna board, and the leads are aligned with a soldering pad 702 of the PCB. In this manner, by using a strip-shaped heating element to press over the leads onto the soldering pad 702, soldering of all the leads can be completed.

Other modifications and adaptations of the above-described preferred embodiments of the present invention may be made to meet particular requirements. This disclosure is intended to exemplify the invention without limiting its scope. All modifications that incorporate the invention disclosed in the preferred embodiment are to be construed as coming within the scope of the appended claims or the range of equivalents to which the claims are entitled.

What is claimed is:

1. A method for fabricating an electromagnetic induction digitizer antenna board, comprising the steps of:
  a. preparing a flat substrate for configuring an electromagnetic induction coil thereon, wherein the substrate is adapted for being holed to form through holes;
  b. providing a consecutive wire leading-out terminal at one side of the substrate for configuring the electromagnetic induction coil on the substrate, wherein the consecutive wire leading-out terminal is adapted for outputting a conducive wire therefrom;
  c. moving the substrate relative to the consecutive wire leading-out terminal along with a predetermined track of the electromagnetic induction coil of the induction digitizer antenna board, so that the consecutive wire leading-out terminal gets in surface-contact with the substrate, and configures the electromagnetic induction coil on the substrate;
  d. during the relative movement of the substrate and the conductive wire leading-out terminal, binding the conductive wire of the electromagnetic induction coil with the substrate at every predetermined interval, an axial direction of the conductive wire of the electromagnetic induction coil being parallel with a horizontal level of the substrate; and
  e. configuring a plurality of electromagnetic induction coils as of step d, wherein the electromagnetic induction coils positioned at a same layer of the substrate overlaps each other, and the overlapped electromagnetic induction coils cross over each other, wherein the electromagnetic induction coils are electrically connected to a computing circuit of a digitizer control board.

2. The method for fabricating the electromagnetic induction digitizer antenna board according to claim 1, wherein in step d, an automatic conductive wire binding mechanism is provided to deliver binding threads to automatically bind the conductive wires, wherein the automatic conductive wire binding mechanism periodically holes the substrate and binds the conductive wires to the substrate at every predetermined interval.

3. The method for fabricating the electromagnetic induction digitizer antenna board according to claim 2, wherein the automatic conductive wire binding mechanism is a computer-aided embroidery machine, and the consecutive wire leading-out terminal is a surface thread output terminal or a bottom thread output terminal of the computer-aided embroidery machine.

4. The method for fabricating the electromagnetic induction digitizer antenna board according to claim 3, wherein the surface thread output terminal or the bottom thread output terminal comprises a needle having a rolling ball configuration, and the needle comprises a through hole and a binding thread is positioned through the thread through hole.

5. The method for fabricating the electromagnetic induction digitizer antenna board according to claim 2, wherein the automatic conductive wire binding mechanism is a quilt sewing machine, and the consecutive wire leading-out terminal is a surface thread output terminal or a bottom thread output terminal of a machine head of the quilt sewing machine.

6. The method for fabricating the electromagnetic induction digitizer antenna board according to claim 5, wherein the surface thread output terminal or the bottom thread output terminal comprises a needle having a rolling ball configuration, and the needle comprises a through hole and a binding thread is positioned through the thread through hole.

7. The method for fabricating the electromagnetic induction digitizer antenna board according to claim 2, wherein the automatic conductive wire binding mechanism is a single-needle single-thread chain-stitch sewing machine, and the consecutive wire leading-out terminal is a wire output opening of a mechanical arm adapted for moving along with a predetermined track of the electromagnetic induction coil of the induction digitizer antenna board.

8. The method for fabricating the electromagnetic induction digitizer antenna board according to claim 7, wherein the surface thread output terminal or the bottom thread output terminal comprises a needle having a rolling ball configuration, and the needle comprises a through hole and a binding thread is positioned through the thread through hole.

9. The method for fabricating the electromagnetic induction digitizer antenna board according to claim 1, wherein the substrate is a fiber surface or a hook surface of a large-size hook and loop tap, and the consecutive wire leading-out terminal is a wire output opening of a mechanical arm adapted for moving along with a predetermined track of the electromagnetic induction coil of the induction digitizer antenna board.

10. The method for fabricating the electromagnetic induction digitizer antenna board according to claim 1, wherein an assembly cutting position is defined, and after configuring and binding the electromagnetic induction coils, the electromagnetic induction coils are connected to the digitizer control board computing circuit and are cut at the assembly cutting position.

11. The method for fabricating the electromagnetic induction digitizer antenna board according to claim 1, wherein in the step d, an electronic control glue dispenser is provided for dispensing glue at every predetermined interval so as to periodically bind the conductive wires to the substrate.

12. The method for fabricating the electromagnetic induction digitizer antenna board according to claim 1, wherein in the step d, the substrate is holed in a manner of hot-melting to periodically bind the conductive wire of the electromagnetic induction coil with the substrate at every predetermined interval.

13. The method for fabricating the electromagnetic induction digitizer antenna board according to claim 1, wherein the consecutive wire leading-out terminal is connected with an X-Y axis track control mechanism.

14. The method for fabricating the electromagnetic induction digitizer antenna board according to claim 1, wherein a computer-aided embroidery machine having a surface thread output terminal or a bottom thread output terminal is employed, wherein one of the surface thread output terminal and the bottom thread output terminal serves as the consecutive wire leading-out terminal and outputs the conductive wires, and another of the surface thread output terminal and the bottom thread output terminal serves as a binding thread output terminal for outputting binding threads to bind the conductive wires.

* * * * *